United States Patent Office 2,823,239
Patented Feb. 11, 1958

2,823,239

PROCESS FOR THE PREPARATION OF AZULENES

Karl Friedrich Lang, Frankfurt am Main, and Max Froitzheim, Castrop-Rauxel, Germany No Drawing. Application September 17, 1954
Serial No. 456,870

Claims priority, application Germany September 19, 1953

20 Claims. (Cl. 260—666)

This invention relates to the synthetic preparation of azulenes from polycyclic hydrocarbons rich in hydrogen at elevated temperatures.

It has been known that hydrogenated cyclic compounds are converted into corresponding compounds containing less hydrogen by splitting of hydrogen at elevated temperatures, particularly in the presence of catalysts. This reaction has been used recently on a large scale for the conversion of naphthenes into aromatic compounds.

Perhydrogenated polycyclic compounds have also been subjected to dehydrogenation under varying conditions. For example, it was suggested to dehydrogenate hydrindane over a contact mass containing platinum and active carbon (see Chemical Abstracts, 1930, page 774). Decahydronaphthalene yields by treatment over aluminum oxide-iron oxide with hydrogen under pressure at 450° C. hydrocarbons which have not been thoroughly investigated (see Berichte Dtsch. Chem. Ges. 63 (1930), p. 159). Dehydrogenation of a considerable number of perhydrogenated polycyclic naphthenes at 450° C. over a specific chromium oxide-aluminum-contact is described in Industrial and Engineering Chemistry, 38 (1946), pp. 1041–1045.

It has now been found that polycyclic compounds of varying degrees of hydrogenation, preferably perhydrogenated hydrocarbons, can be converted with good yields into azulenes at high temperatures and in the presence of suitable catalysts and diluting agents, such as for example steam or inert gases. If the period of contact with the catalyst is sufficiently small, it will be found that decomposition of the perhydrogenated hydrocarbon takes place to a small extent only and as a product of catalysis, for example, a product of dark blue color is obtained. From the latter the azulenes can be recovered in known manner, for example by adsorption with aluminum oxide, extraction, as double compounds and the like.

As catalysts, conventional dehydrogenation contact substances can be used, such as for example oxides of elements of the 1st to 4th group of the periodic system, to which oxides or other compounds of metals, e. g. of the 6th–8th group of the periodic system, can be added.

In carrying out the present invention, the reaction temperatures are in the range of 350° and 650° C., preferably in the range of 570° and 630° C. The protecting and diluting effect of steam or gases, which are inert under the reaction conditions, is essential in the process of the invention. Thereby it is possible to keep the dehydrogenation loss of hydrocarbons at a low level even at temperatures exceeding 600° C. Therefore, it is possible to use the non-converted portions of the perhydrogenated hydrocarbon in a cycle and extensively convert them into azulenes.

It has been found that by suitable combination of the catalyst, diluting agent, reaction temperature and time of contact, the conditions of the process can be adjusted in such manner that dehydrogenation of the starting material is extensively avoided, even if catalysts are used, which are known to have a strong dehydrogenating effect under other conditions.

As examples of hydrocarbons which can be used in carrying out the present invention, dicyclopentadiene, tetrahydrodicyclopentadiene, decahydronaphthalene and its alkyl and aryl derivatives, and perhydroacenaphthene are mentioned.

*Example 1*

Superheated steam of about 300°–350° C. is passed through tetrahydrodicyclopentadiene which has been heated to about 100° C. and the mixture of vapors thus formed is passed through a contact furnace which is charged with a catalyst consisting of a mixture of zinc oxide, aluminum oxide, calcium oxide, magnesium oxide, potassium chromate and potassium sulfate. This catalyst was previously activated with air at 500°–600° C.

Said mixture of vapors is passed over the catalyst layer at about 615° C. and then cooled, whereby a blue-black crystal mass is separated in the receiver. The crystal mass is dissolved in light gasoline and the solution is extracted by shaking with sulfuric acid of 50% by volume. Azulene is separated from the sulfuric acid extract by diluting it with ice water. The azulene thus obtained is purified in conventional manner and is then recovered in the form of dark blue plates. The composition and characteristics of the compound thus prepared are identical with those of azulene known from the prior art.

*Example 2*

Dicyclopentadiene is treated in the manner and under the conditions described in Example 1, but at a temperature of 570° C.

After being passed through the contact furnace over the catalyst described in Example 1, the mixture of vapors is cooled whereby a green-blue solution is obtained as condensate in the receiver. From this solution the azulene is separated by means of phosphoric acid preferably under cooling with ice. From the phosphoric acid solution the azulene is recovered in conventional manner.

*Example 3*

Perhydroacenaphthene is treated in the manner and under the conditions described in Example 1, whereby upon cooling a green-blue reaction product is obtained in the receiver. This product is subjected to fine fractionation under vacuum. The azulene is enriched in the first runnings and is separated from the latter in conventional manner.

If decahydronaphthalene or its alkyl or aryl substitution products are subjected to the reaction of the present invention, they yield products consisting of azulene or substitution products of azulene, the composition of which depends on the composition of the respective starting material. The reaction products can be separated from the resulting mixtures by precipitation or their presence can be shown by the absorption spectra (see for example Angewandte Chemie 62 (1950), pp. 281–289).

*Example 4*

Decahydronaphthalene is subjected to the catalytic treatment described in the above Example 1, i. e. passing through the starting material heated to about 100° C., superheated steam of about 300°–350° C. and passing the resulting mixture of starting material and steam through a contact furnace over the catalyst described in Example 1, at about 615° C. The mixture discharged from the furnace is cooled, whereby a dark blue solution is obtained. By subjecting this solution to distillation in order to remove the non-converted starting material, a residue is formed which is enriched with azulene. This residue is diluted with pentane and the diluted solution is subjected to chromatography with aluminum oxide in order to separate the azulene.

Example 5

By substituting methyl-decahydronaphthalene for decahydronaphthalene in the preceding Example 4 and following the procedure and condition of said Example 4, methylazulene is obtained and can be identified spectroscopically in the reaction product.

Example 6

By substituting dimethyl-decahydronaphthalene for the decahydronaphthalene used in the above Example 4 and following the procedure and conditions described in Example 4, dimethylazulene is formed and can be identified spectroscopically in the reaction product.

The formation of azulenes by the action of dehydrogenation catalysts on perhydrogenated polycyclic compounds of the above described type is novel and it is unexpected because no azulenes were previously obtained by dehydrogenation of such hydrocarbons, although dehydrogenation of the same has been frequently investigated.

The invention provides a new and improved synthetic procedure for the preparation of azulenes which could be prepared synthetically by troublesome and complicated procedures and with low yields only prior to the present invention.

It has been found that azulenes are formed in the process of the invention also at temperatures above 650° e. g. up to 700° C., but best results are obtained in the temperature ranges mentioned above.

In carrying out the present invention, it has been found that starting mixtures containing the hydrocarbon to be treated and the diluent in the proportion of 1 to 20 parts by weight, preferably 1 to 4, give good results. As examples of diluents, in addition to steam, nitrogen, carbon dioxide and argon are mentioned. The ingredients of the catalyst, and the ratio of the ingredients can vary, provided the mixture of said ingredients is a normal dehydrogenation contact. The catalyst described in the above Example 1, can have the following composition:

ZnO, 70 to 80%, preferably 77.4%; $Al_2O_3$, 7 to 8%, preferably 7.6%; CaO, 4 to 5%, preferably 4.7%; MgO, 4 to 5%, preferably 4.7%; $K_2CrO_4$, 2 to 3%, preferably 2.8%; $K_2SO_4$, 2 to 3%, preferably 2.8%.

Some examples of catalysts consisting of other ingredients are as follows:

(1) ZnO, 60 to 70%, preferably 64.5%; MgO, 3 to 2%, preferably 3.2%; $SiO_2$, 12.5 to 13.5%, preferably 12.9%; $Al_2O_3$, 13 to 14%, preferably 14.2%; $K_2SO_4$, 2 to 3%, preferably 2.6%; $K_2Cr_2O_7$, 2 to 3%, preferably 2.6%.

(2) MgO, 94 to 97%, preferably 96.1%; $Fe_2O_3$, 2 to 3%, preferably 2.4%; $Cu(OH)_2$, 0.5 to 1%, preferably 0.9%; KOH, 0.5 to 1%, preferably 0.6%.

Good results have been obtained by carrying out the process of the invention under normal atmospheric pressure by passing the vapors over the catalyst in a ratio of about 200 g. of hydrocarbon per 1 ltr. of catalyst per hour. The phosphoric acid used in the above Example 2, is an 85% aqueous solution of $H_3PO_4$. In the procedure described in the above Example 3, it has been found that fractionation of 74 to 90° C. under an absolute pressure of 30 mm. gives good results. As mentioned above, separation of azulenes from the reaction products is carried out according to known methods, described, for example in Helvetica chimica acta, XXXVI (1953), pages 1184–1185; see also Journal American Chemical Society 75 (1953), 2386; Zeitschrift für angemandte Chemie 56 (1943), page 8.

The parts and percent mentioned in the application are by weight, if not otherwise stated.

The term "azulenes" is used in the present application to denote azulene proper of the formula:

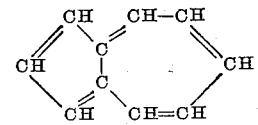

and its derivatives, e. g. alkyl and aryl derivatives.

It will be understood from the above that while the best mode of carrying out the invention is described in the above Examples, various modifications can be made without departing from the scope of the invention, as defined in the appended claims.

What is claimed is:

1. A process for converting polycyclic hydrocarbons having no azulene structure in the molecule and being rich in hydrogen into compounds containing azulene structure in the molecule, comprising bringing in contact said hydrocarbons, in the presence of a diluent which is inert under the conditions of the process, with a dehydrogenation catalyst, in the temperature range of 550°–650° C.

2. A process as claimed in claim 1, in which a temperature in the range of 570°–630° C. is used.

3. A process as claimed in claim 1, in which a perhydrogenated polycyclic hydrocarbon is used as starting material.

4. A process as claimed in claim 1, in which the catalyst consists of a mixture of oxides of metals of the first to fourth group of the periodic system.

5. A process as claimed in claim 1, in which the catalyst consists of a mixture of oxides of metals of the first to fourth group of the periodic system, to which a compound of a metal of the sixth to 8th group of the periodic system is added.

6. A process as claimed in claim 1, in which the catalyst consists of a mixture of zinc oxide, aluminum oxide, calcium oxide, magnesium oxide, potassium chromate, and potassium sulfate.

7. A process as claimed in claim 1, in which the diluent is steam.

8. A process for converting polycyclic hydrocarbons having no azulene structure in the molecule and being rich in hydrogen, into compounds containing azulene structure in the molecule, comprising passing said polycyclic hydrocarbons in the vapor phase, in the presence of a diluent which is inert under the conditions of the process, over a dehydrogenation catalyst in the temperature range of 550°–650° C.

9. A process for the preparation of azulenes, comprising passing a perhydrogenated hydrocarbon having no azulene structure in the molecule and being selected from the group consisting of compounds of the cyclopentadiene series, naphthalene series and acenaphthene series, in the vapor phase, in the presence of a diluent which is inert under the conditions of the process, over a dehydrogenation catalyst in the temperature range of 550°–650° C.

10. A process as claimed in claim 9, in which a temperature in the range of 570°–630° C. is used.

11. A process as claimed in claim 9, in which the diluent is steam.

12. A process as claimed in claim 9, in which the catalyst consists of a mixture of oxides of metals of the first to fourth group of the periodic system.

13. A process as claimed in claim 9, in which the catalyst consists of a mixture of oxides of metals of the first to fourth group of the periodic system, to which a compound of a metal of the sixth to eighth group of the periodic system is added.

14. A process as claimed in claim 9, in which the catalyst consists of a mixture of zinc oxide, aluminum oxide, calcium oxide, magnesium oxide, potassium chromate, and potassium sulfate, said catalyst being activated with air at 500°–600° C.

15. A process as claimed in claim 9, in which the starting material is tetrahydrodicyclopentadiene.

16. A process as claimed in claim 9, in which the starting material is dicyclopentadiene.

17. A process as claimed in claim 9, in which the starting material is perhydroacenaphthene.

18. A process as claimed in claim 9, in which the starting material is decahydronaphthalene.

19. A process as claimed in claim 9, in which the starting material is a methyl-decahydronaphthalene.

20. A process as claimed in claim 9, in which the catalyst consists of a mixture of the following ingredients:

| | Percent |
|---|---|
| Zinc oxide | 70 to 80 |
| Aluminum oxide | 7 to 8 |
| Calcium oxide | 4 to 5 |
| Magnesium oxide | 4 to 5 |
| Potassium chromate | 2 to 3 |
| Potassium sulfate | 2 to 3 |

References Cited in the file of this patent

UNITED STATES PATENTS 2,766,304   Ziegler et al. _____ Oct. 9, 1956

OTHER REFERENCES

Industrial and Eng. Chemistry, vol. 38 (1946), pages 1041 to 1045.

Helvetica Chimica Acta, vol. 33 (1950), pages 1911 to 1918.

Anderson et al.: Jour. Amer. Chem. Soc., vol. 73 (1951), pp. 232–235.

"The Azulenes," Maxwell Gordon Chemical Reviews, vol. 50 (1952), pages 127 to 200.

Faraday: Encycl. of Hydrocarbon Compounds, $C_{10}H_{2-14}$, 1952, p. 10007.00.11 to p. 10007.00.13.

Doering et al.: Jour. Amer. Chem. Soc., vol. 75 (1953), p. 2386.